Figure 1:
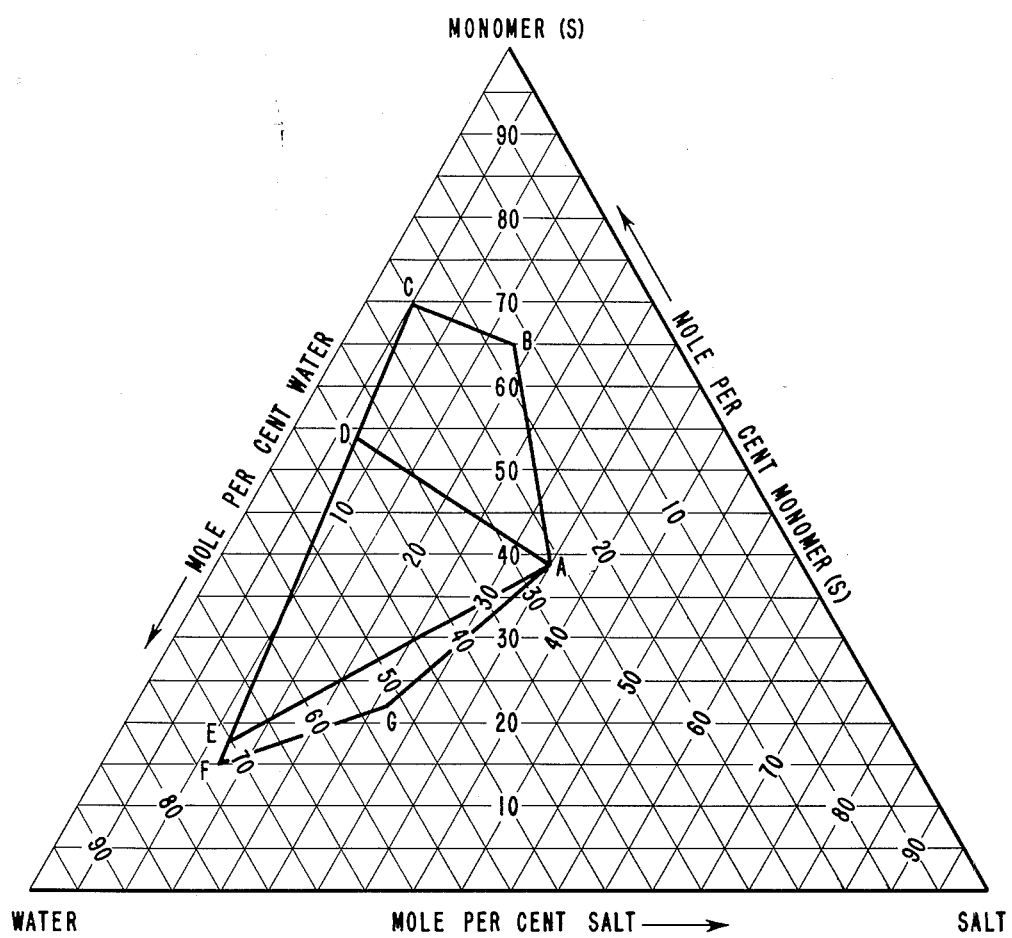

Oct. 2, 1962 R. W. HENDRICKS 3,056,169
PROCESS OF PREPARING SHAPED ARTICLES OF ACRYLONITRILE
POLYMER CONTAINING SILVER INSOLUBLE PARTICLES
Filed Sept. 28, 1959 2 Sheets-Sheet 1

INVENTOR
ROBERT WILLIAM HENDRICKS

BY *Herbert G. M. Wolfson*

ATTORNEY

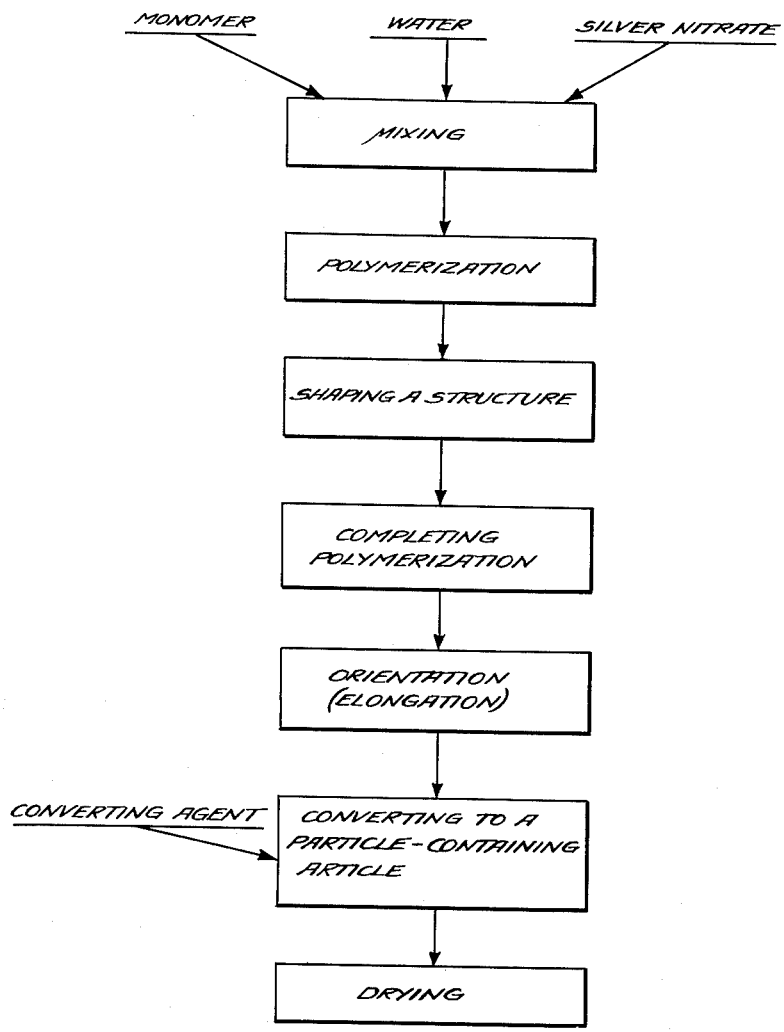

3,056,169
PROCESS OF PREPARING SHAPED ARTICLES OF ACRYLONITRILE POLYMER CONTAINING SILVER INSOLUBLE PARTICLES
Robert William Hendricks, Wilmington, Del., assignor to E. I. du Pont de Nemours and Company, Wilmington, Del., a corporation of Delaware
Filed Sept. 28, 1959, Ser. No. 842,870
14 Claims. (Cl. 18—57)

This invention relates to the preparation of polymers in the form of shaped articles containing a substantial amount of free metal or other insoluble particles. More particularly, the invention relates to the preparation of self-supporting, strong acrylonitrile polymeric films containing free silver or silver halide particles.

Metalized films and similar metalized polymeric articles are becoming increasingly important in this electronic age. Shielding for electronic and magnetic equipment, tape for magnetic recording devices, units in radiant heating structures, seat covers for automobiles, the construction of electrolytic condensers and wave guides for microwave applications are only some of the uses for these metalized polymeric articles. If the cost of forming these articles could be reduced and the process of forming them improved, then the market for these materials would be almost limitless.

Heretofore, these metalized articles have been formed using sputtering, vacuum or electroplating techniques. Any method less complicated or less expensive than these has failed to provide adequate adhesion between particle and base material. Even the aforementioned techniques sometimes require a preliminary surface treatment, e.g., mechanical roughening, chemical modification, or so-called freshening, for satisfactory results. In some instances, the surface must be heated and, in the case of many metal particles, the prior art processes are a slow, tedious affair.

An object of the present invention is a relatively speedy, simple and economical technique to prepare shaped acrylonitrile polymeric articles containing silver and silver halide particles, the adhesion of particle to shaped article being firm and tenacious. A further object is to provide such particles without adversely affecting the desirable properties of the polymeric base material. Other objects will appear hereinafter.

The process involves the steps of mixing three essential ingredients, 15–70 mole percent of at least one polymerizable monomer, 75–100% of said monomer being acrylonitrile, 5–35 mole percent of silver nitrate and 17–73 mole percent water, each of the percentages of said essential ingredients falling within the area defined by ABCDEFG of FIGURE 1, preferably within the area defined by ADE of FIGURE 1; polymerizing the monomer in the mixture to form a silver nitrate-containing polymer; shaping the polymer into a shaped article, preferably into a self-supporting film; completing polymerization if necessary; converting the silver nitrate to water-insoluble particles selected from the group consisting of silver, silver sulfide and silver halide (silver chloride, silver bromide and silver iodide); and, thereafter, drying the particle-containing shaped article at a temperature of 50–250° C., preferably at a temperature above 90° C.

The term "shaped article," as used herein, is meant to include films, sheets, fibers, fabrics, rods, tubes and the like. The preferred form of shaped article, as well be evident from the subsequent examples, is a self-supporting film of the polymeric material.

In the preferred process, a tough oriented polyacrylonitrile film is formed as the base for the metal particles without fibrillating the film. This process comprises mixing the three essential ingredients (monomer(s), silver nitrate and water) in critical proportions according to FIGURE 1 as above; polymerizing the monomer(s) in the mixture to form a silver nitrate-containing polymer; shaping the polymer into a self-supporting film; if necessary, completing polymerization; elongating the film still containing silver nitrate in at least one direction, preferably elongating the self-supporting film at least 1.5× in two mutually perpendicular directions; converting the silver nitrate to water-insoluble particles selected from the group consisting of silver, silver sulfide and silver halide; and, thereafter, drying the particle-containing film at a temperature of 50–250° C., preferably at a temperature above 90° C.; the latter two steps all performed while holding the film under tension.

This latter process, which is of particular significance when applied to the formation of highly oriented polymeric films, requires certain steps which steps were contrary to anything known heretofore in the prior art. Surprisingly, orientation that cannot be imparted without adversely affecting an acrylonitrile-containing polymeric film containing no inorganic salt, can be imparted to such a film containing the silver salt. Furthermore, this orientation is not lost to any significant extent during the subsequent treating steps.

The critical steps required to produce these results will be discussed in subsequent sections under the following headings:

(1) Mixing essential ingredients.
(2) Polymerization.
(3) Shaping the material.
(4) Completing polymerization.
(5) Orientation.
(6) Converting to a particle-containing article.
(7) Drying.

FIGURE 2 shows an illustrative flow sheet of the above critical steps. These steps are described in detail hereinafter.

MIXING ESSENTIAL INGREDIENTS

The three essential ingredients—monomer/water/silver nitrate—must be mixed together in such proportions as to form a homogeneous or single-phase system at substantially room temperature. Furthermore, the composition must be such that the homogeneous polymeric structure formed by polymerizing the mixture is orientable. "Orientable" is defined as capable of being stretched 4× (300%) at a temperature no higher than 30° C.

The compositions operable in the present process fall within the area ABCDEFG of FIGURE 1. The points defining this area correspond to the following mole percentages of monomer/salt/water:

A—39/35/26
B—65/18/17
C—70/5/25
D—54/7/39
E—17/11/72
F—15/12/73
G—22/26/52

In referring to the proportions of the components, it should be understood that the sum of the mole percentages of the three essential components will add up to 100 mole percent. The content of additional ingredients present in minor amounts, such as a photoinitiator and/or an acid are neglected.

While all compositions resulting in polymerized salt-containing films which are orientable in the present sense, i.e., those having tensile elongations of at least 300% (4×), are found to have utility in the preparation of biaxially stretched films, the compositions which provide polymerized salt-containing films having tensile elongations between 400% (5×) and 900% (10×) offer special advantages in the preparation of highly oriented, biaxially stretched films, and are therefore preferred for use in this invention. These salt-containing films, in addition to having the ability to be stretched to an extent of at least 2.0× in each of two mutually perpendicular directions with an accompanying high orientation efficiency during stretching, also have a high level of toughness, as indicated, for example, by relatively high tensile strengths, which tends to facilitate the continuous high speed operation desired in a commercial process. The area within which such preferred compositions fall is given on FIGURE 1 by the area ADE. The points defining this area correspond to the following mole percentage of monomer/salt/water:

A—39/35/26
D—54/7/39
E—17/11/72

It should be emphasized that the composition limits shown for the silver salt all relate to the characteristics of the resulting mixtures, both before and after polymerization, at essentially room temperature. Since the relative solubilities of the essential components as well as the mechanical properties of the resulting polymeric films (related to orientability) are somewhat temperature sensitive, it will be recognized that at somewhat elevated temperatures or lowered temperatures the operable composition limits both before and after polymerization will be somewhat different than shown on the figure. Within the range from about 0 to 50° C., these differences are relatively small, however, and operating within this temperature range may be considered to be included explicitly within the scope of this invention.

The most critical aspect of the composition limits on monomer, water and salt which are polymerized to form the homogeneous salt-containing structure is that the film be orientable at substantially room temperature, as hereinbefore defined, regardless of whether orientation is contemplated. It is possible to prepare various homogeneous salt-containing films which are not orientable in the present sense merely by adjusting the composition of the mixture to be polymerized prior to polymerization. It would thereafter, of course, be possible to readjust the composition prior to the orientation step in order to effect conversion to an orientable structure, for example; by changing the water content of the coalesced structure, by aging the structure in an atmosphere of suitable humidity. Alternatively, a coalesced film falling outside of the critical composition area could be converted to a film of the proper composition for orientation by immersing the film briefly in a bath of an aqueous solution of silver nitrate of suitable concentration and temperature. While such variations are obviously less convenient than operating according to the direct preferred mode as herein described, they might be used if desired without departing from the spirit of this invention.

In the present invention the monomeric polymerizable component necessarily comprises at least 75%, and preferably at least 85% acrylonitrile. Other monomeric polymerizable compounds containing ethylenic unsaturation, and which are copolymerizable with acrylonitrile may be added to the monomeric acrylonitrile component. Examples of ethylenically unsaturated monomers copolymerizable with acrylonitrile include the acrylates and alkacrylates, such as methyl acrylate, ethyl acrylate, butyl acrylate, 2-ethylhexyl acrylate, methyl methacrylate, butyl methacrylate, hexyl methacrylate, etc.; vinyl chloride, vinyl acetate, vinylidene chloride, styrene, and compounds selected from the class consisting of vinyl arene sulfonic acids and their water-soluble salts, N-vinylpyrollidone, 2-methyl-5-vinylpyridine and other monomers disclosed in U.S. Patents 2,436,926 and 2,456,360.

In mixing monomer/water/metal salt together, the order of adding the components together appears to make no difference in the ultimate results. That is, water may be added to previously mixed metal salt and monomer or monomer may be added to previously mixed metal salt and water.

It has been found that polyhydric alcohols such as glycerol and ethylene glycol may be substituted for a portion of the water in the mixture prior to polymerization. This has the effect of increasing the toughness of the polymerized films at room temperature, and also acts to increase the elongation and therefore the orientability of the films at elevated temperatures as compared with the purely water-containing films, which tend to lose water and thereby become less orientable at high temperatures. Since the alcohols tend to reduce the mutual solubilities of the salt and monomer as compared with equimolar quantities of water, their use is restricted to no more than 50% of the water normally used.

POLYMERIZATION

The type of apparatus and vessel employed for carrying out polymerization will depend upon the type of shaped structure which is to be ultimately formed from the polymer, and it will also depend upon the mode of polymerization, i.e., whether the shaped article is to be formed in accordance with a batch process or a continuous process. If the polymerization is to be carried out batch-wise, the liquid mixture of monomer/water/metal salt is introduced into a vessel which will form the polymerizing mass into its ultimate shape. For example, to form a film or sheet, a cell composed of two sheets of glass or suitable plastic material separated by a flexible gasket (as described in Rohm et al. U.S. Patent 2,067,-580) may be employed as the confining vessel to form coalesced films or sheets. On the other hand, if a film or filament is to be formed continuously, the initial mixture of monomer/water/metal salt may be subjected to polymerization conditions in a vessel for a time sufficient to form a relatively fluid prepolymer (which is more viscous than the initial mixture), and this prepolymer may be continuously extruded into very thin tubes or rods to form filaments, or it may be extruded onto a continuously moving belt or drum in order to shape the fluid mass into the form of a film and then complete the polymerization.

Polymerization of the monomer/water/metal salt mixture may be carried out by conventional techniques known to the art. Energy required to effect polymerization may be supplied by heat, ultraviolet light, and/or ionizing radiation. When polymerization is effected by heat, well-known thermal polymerization catalysts may be used, such as the peroxides, e.g., benzoyl peroxide, and similar types of aromatic and aliphatic peroxides, or the well-known azo catalysts described in U.S. Patent 2,471,959 to Madison Hunt may be employed. When ultraviolet light is used, well-known photopolymerization catalysts may be employed such as benzoin and similar types of acyloin catalysts, and the acyloin ethers (Benzoin methyl ether) described in U.S. Patents 2,367,660, 2,367,661 and 2,367,670. Polymerization may be effected in the substantial absence of any added catalyst by employing low or high energy ionizing radiation, such as particle irradiation (e.g., electrons) or electromagnetic irradiation (e.g., X-rays and gamma-rays). Other types of ionizing radiation include particle irradiation such as protons, deuterons and alpha-particles. The particles may be accelerated to a high speed by means of a suitable voltage gradient using devices such as a resonant cavity accelerator, a Van de Graaff generator, a betatron, a synchrotron, a cyclotron or the like. The radiation may equally be supplied by the use of radioactive isotopes.

It is found that the presence of atmospheric oxygen generally tends to provide a temporary inhibitory action towards polymerization at room temperature. This can easily be overcome in practice by the use of a slight excess of polymerization catalysts or ionizing radiation. There is, therefore, no necessity for excluding oxygen from the mixture prior to polymerization, although this can be done if desired.

SHAPING THE MATERIAL

Where this step fits into the sequence of steps of this invention depends upon the particular process to be employed for forming a shaped article, such as a film or filament. For example, in forming a salt-containing homogeneous film, the initial mixture of monomer/water/salt may be introduced into a glass cell composed of two glass plates separated preferably by a flexible or resilient gasket, and the mixture may then be polymerized to completion in such a cell. The resulting product is in the form of a preformed salt-containing film or sheet which is then ready for orientation.

On the other hand, such a process is limited to batch operation. A feasible continuous process would involve prepolymerizing the initial mixture of monomer/water/salt in a relatively large vessel to form a syrup or relatively viscous prepolymer which may then be readily extruded into a multiplicity of thin tubes or rods to form filaments; or it may be extruded onto a moving belt or drum to form a film.

The present invention is particularly adaptable to the formation of films and filaments, more particularly to the formation of highly oriented films containing polymer of high molecular weight. Therefore, it is necessary that sometime before completion of polymerization of the initial monomer/water/salt system, that the polymerizing mass be introduced into an apparatus which shapes the polymerizing mass into the essential shape of the desired final structure prior to completion of the polymerization to form the orientable, self-supporting, highly viscous, salt-containing structure. As mentioned hereinbefore, the scope of this invention embraces the formation of various types of shaped articles besides films and filaments, such as rods and tubes.

COMPLETING POLYMERIZATION

This step is necessary in the event that a continuous process is employed for forming shaped articles wherein the initial mixture of monomer/water/salt is prepolymerized in a separate vessel to form a relatively fluid viscous polymerizing mass and the polymerizing mass formed into a shaped article, such as a film or filament. In such cases, polymerization of the polymerizing mass must be substantially complete in order to form a tough, rubbery, orientable shaped article, since the monomer tends to exert a very noticeable plasticizing action for the shaped article. If polymerization were not substantially complete, it would be found that the characteristics of the resulting shaped articles would be difficult to control, due to the volatility of the unpolymerized monomer.

Completion of polymerization of the shaped article may be carried out employing the same or a different source of polymerization energy than that used in carrying out prepolymerization of the initial monomer/water/salt mixture.

ORIENTATION

The term, orientation, is used herein to apply to the step of elongating the homogeneous, salt-containing shaped article in one or two mutually perpendicular directions as in the preferred process. Elongation, as mentioned hereinbefore, may be carried out by stretching and/or rolling the article in one or two mutually perpendicular directions. In the case of orienting homogeneous salt-containing filaments, stretching may be carried out by passing the filaments around rolls or pulleys rotating at differential speeds. Film stretching may be carried out by a number of well-known techniques, such as passing the film longitudinally between two pairs of nip rolls rotating at different speeds or by wrapping the film around rolls and stretching between a bank of slow rolls and fast rolls. Transverse stretching of film may be effected by using well-known tentering apparatus whereby tenter clips grasp the edges of the film and diverge gradually as the film moves in a longitudinal direction. Any well-known stretching apparatus of the type described in the prior art may be employed for stretching a homogeneous salt-containing film simultaneously in two directions. It is also within the scope of the present invention to extrude the prepolymer system into tubular form and thereafter orient the tubing by blowing, where a unidirectional stretch is desired, or by blowing and longitudinal stretching of the tubing where biaxial stretching is desired.

In order to maintain the composition of the homogeneous salt-containing article relatively constant, that is, the same as the composition of the article immediately after completion of polymerization, the salt-containing article is oriented in an inert gaseous atmosphere or in air. Orientation is preferably carried out essentially immediately after completion of polymerization, but the salt-containing article may be stored under conditions such that the composition of the article remains substantially constant prior to orientation. It is desirable that the atmosphere in which the salt-containing article is stretched have a relative humidity of at least 30%. On the other hand, the condition of the inert gaseous atmosphere must be such that the composition of the salt-containing film during orientation is not substantially changed, as by the addition of excess water.

In order to obtain the benefits of the present process, the coalesced film or other structure must be stretchable in a single direction to an extent of at least $4 \times$ and preferably $5 \times$ at room temperature in air at 50% relative humidity. In the case of forming biaxially oriented film, the homogeneous salt-containing film structure must be stretchable in each of the two mutually perpendicular directions to an extent of at least $1.5 \times$ and preferably at least $2 \times$ in order to be capable of being converted to final tough films having a relatively high level of impact strength and durability. To form films having maximum toughness, the homogeneous salt-containing films should be stretched to substantially the highest extent possible in two mutually perpendicular directions which may be up to $3.5 \times$ in each direction. However, to form films having a relatively high degree of post-formability combined with suitable toughness for laminations to metal substrates, the homogeneous salt-containing films are preferably stretched $1.5 \times$ to $2.0 \times$ in the two mutually perpendicular directions.

CONVERTING TO A PARTICLE-CONTAINING ARTICLE

After completing polymerization or, in the preferred process, after orientation, the silver nitrate-containing polymeric article may be converted to a shaped article containing silver particles by reducing the silver nitrate to the free metal by reaction with a solution of sodium borohydride, hydroquinone, pyrogallol, catechol, diborane, sodium sulfite, sodium bisulfite, sodium hyposulfite, hypophosphorous acid, hydrazine, hydrazine hydrochloride or reducing sugars such as dextrose.

Conversion of the silver nitrate to useful insoluble silver halide particles such as silver chloride, silver bromide or silver iodide particles may be accomplished by reaction with at least one halogen selected from the group consisting of bromine, chlorine and iodine, the halogen in a form selected from the group consisting of halogen acid, halogen salt and free halogen to convert the silver nitrate to silver halide particles. Specifically, this conversion step may be accomplished by exposing the silver nitrate-containing film to the vapors of the free halogen or the halogen acid. The conversion may also be accomplished by using an aqueous solution of a soluble halide such as the alkali metal (sodium or potassium) halide or a solution of the halogen acid. This latter treatment with an aqueous solution, surprisingly, does not wash out silver salt from the film.

If desired, sensitizers such as allyl diethylthiourea or allylisothiocyanate may be added to the film during or subsequent to the conversion treatment to increase light sensitivity. These light sensitizers appear to be capable of depositing silver sulfide on the silver halide grains to increase the sensitivity of the silver halide grains to the effect of light.

The silver nitrate-containing polyacrylonitrile film may be converted to a photo-conductive silver sulfide-containing polyacrylonitrile film by treatment with hydrogen sulfide.

The conversion treatments may be performed at room temperature (20° C.) or slightly above. The duration of the treatments should be at least 10 seconds and may be as high as 2 minutes, depending upon the thickness of the film being treated.

The final concentration of particles in and on the polymeric material may range anywhere from 0.5% to as high as 65% of the total weight of polymer plus particles, without substantially altering the physical properties of the polymeric substrate. However, for most purposes, a range of 15–45% of particles suffices.

In the case of the oriented article, it is important to maintain the article under tension during any of these conversion treatments. Otherwise, the base polyacrylonitrile film tends to lose the improved properties provided by orientation.

DRYING

In order to complete the process of the present invention, it is necessary to remove water from the particle-containing structure, the remaining water being essentially that which is in equilibrium with the surrounding atmosphere. Here again, it is critical that when the drying step is carried out on an oriented film or filament or other oriented shaped article, the article is maintained under tension such that essentially no change in dimensions is permitted during the drying step. Drying may be accomplished at room temperature but is usually performed at a temperature of 50–250° C., preferably at a temperature above 90° C. as explained hereinafter.

In the case of oriented articles, relatively highly oriented, durable films and other articles are obtained by drying at room temperature or thereabouts while maintaining tension. However, articles of increased orientation and decreased void content are obtained by heat treatment at temperatures from 90° C. to the temperature beyond which thermal degradation of the polymer occurs, preferably from 150°–250° C., for a time sufficient to raise the film density to at least 1.170 grams per cubic centimeter as described in copending application U.S. Serial No. 740,140, filed June 5, 1958, to K. R. Osborn and assigned to the assignee of the present application. This effect is also useful in locking in the metal or salts introduced by the process of this invention. A denser structure may also be obtained by pressure rolling the film after it has been dried.

The final silver-containing articles may be used as such as electrolytic condensers, in magnetic recording devices, as catalyst carriers, as automobile seat covers, in decorative articles, etc. The articles may also be used as a base material or anchorage subcoat upon which to plate other metals. Superior adhesion of the resulting metallic coating is thus obtained.

The silver halide-containing articles are useful in photographic applications. The polyacrylonitrile base material is particularly advantageous in this regard. Films of acrylonitrile polymers, particularly those of the homopolymer polyacrylonitrile, are not substantially affected by changes in temperature. They have an equally low sensitivity to changes in humidity. The use of acrylonitrile polymeric films as a photographic film base, therefore, eliminates two very bothersome factors in the preparation and storage of photographic film.

The invention will be more clearly understood by referring to the examples which follow, Example 1 representing the best mode contemplated for performing the process of the invention. The examples, which illustrate specific embodiments of the present invention, should not be considered to limit the invention in any way.

*Example 1*

The following components were mixed together at room temperature to form a clear, homogeneous relatively non-viscous solution:

| | Grams | Mole Percent [1] |
|---|---|---|
| Acrylonitrile monomer | 63 | 40 |
| Silver nitrate | 101 | 20 |
| Distilled water | [2] 20 | 40 |
| Benzoin methyl ether | 0.8 | |
| Concentrated nitric acid | [2] 2 | |

[1] Based on sum of monomer, salt and water.   [2] Mls.

The solution was poured between two thin glass plates spaced 20 mils apart (using a film of polyethylene terephthalate 20 mils in thickness as a spacer), employing clamps to hold the glass plates in position. The resulting closed cell was exposed to ultraviolet light from a bank of five Westinghouse fluorescent sunlamps (15 watts each) for approximately 20 minutes. The plates were separated and the resulting clear, homogeneous, coalesced, salt-containing film was stripped from the plates. This film was clear, relatively tough, flexible, and displayed an elongation of over 300%. Qualitatively, the film resembled a sheet of clear vulcanized rubber.

The polymerized, salt-containing film was then stretched at 60° C. to an extent of about 2.5 times (2.5×) (150% elongation) its original length using a nip-roll stretcher.

After the film was stretched to the desired extent, it was maintained under tension and immersed for 5 minutes in a 2% solution of sodium borohydride in water at room temperature. The reaction was stopped by adding acetone to consume the remaining sodium borohydride.

The resulting film was clamped in a frame to maintain the film under tension and was dried in an oven for one hour at 130° C.

The originally transparent film had been converted to a shiny, metallic appearing, tough film. A microphotograph taken of the cross section of the film showed the center portion of the film to be transparent, whereas the portions adjacent to the surfaces were opaque. The surface resistivity of the film was less than 500 ohms/square.

*Example 2*

A portion of the unstretched wet polyacrylonitrile film containing silver nitrate, prepared as in Example 1, was immersed without stretching in a 2% solution of sodium borohydride at room temperature for 20 minutes. The originally transparent film was converted immediately to a shiny, metallic appearing, opaque film. A microphotograph taken of the cross section of the film showed the film to be opaque throughout. The surface resistivity of the film was less than 500 ohms/square.

*Example 3*

The silvered polyacrylonitrile film, prepared as described in Example 1, was immersed in a bath heated to 65° C. The bath was composed of the following ingredients: 100 parts distilled water, 2.4 parts nickel chloride hexahydrate, 0.3 part dimethylamine-borane and 1.6 parts sodium acetate. The pH was adjusted to 5.0 by the addition of 6 drops of glacial acetic acid. Upon immersion of the silvered film in the plating bath, it was observed that hydrogen evolved from the film surface. After 5 minutes of immersion in the bath the film was removed. After drying, the surface resistivity of the film was measured. A surface resistivity of 0.6 ohm/square was obtained on the plated film, compared with a surface resistivity of 2.9 ohms/square obtained on the film before plating. The adhesion of the nickel coating to the polymeric substate was excellent.

Example 4

The transparent polyacrylonitrile film containing silver nitrate, prepared as described in Example 1, was immersed in a 10% aqueous solution of sodium sulfide, which resulted in the deposition of a black material, silver sulfide, within the film. Very little of the precipitate formed on the surface of the film or in the solution.

Example 5

The wet silver nitrate-containing film of Example 1 was blotted dry with a paper towel and hydrogen chloride gas was passed over one side of the film for approximately 30 seconds. The initially clear film became nearly opaque and white upon this treatment with hydrogen chloride. The film was then placed under a transparent sample of film which had the letter "B" inscribed on it in opaque ink, and the resulting laminar structure was placed in front of a bank of fluorescent sunlamps for approximately one minute with the silver chloride-containing film behind the lettered film. Upon removal from the lamps, the top film was peeled off and it was found that the image of the letter was visible (as a semi-transparent white-unreduced portion) on a black background of reduced silver in the bottom film. The resulting film was then washed thoroughly in a bath of saturated sodium thiosulfate to remove unreduced silver chloride and silver nitrate to "fix" the image. The film displayed excellent physical properties.

Example 6

A sample of the wet stretched silver nitrate-containing polyacrylonitrile film prepared as in Example 1 was blotted dry with a paper towel and a 50/50 weight percent mixture of hydrogen bromide gas and hydrogen iodide gas was passed over one side of the film for approximately 30 seconds. The initially clear film became nearly opaque and pale yellow. The film was then placed under a transparent sample of film which had the letter "B" inscribed on it in opaque ink, and the resulting laminar structure was placed in front of a bank of fluorescent sunlamps for approximately one minute with the silver bromide/silver iodide-containing film behind the lettered film. Upon removal from the lamps, the top film was peeled off and it was found that the image of the letter was visible (as a semi-transparent white-unreduced portion) on a black background of reduced silver in the bottom film. The resulting film was then washed thoroughly in a bath of saturated sodium thiosulfate to remove unreduced silver halide and silver nitrate to "fix" the image. The film displayed excellent physical properties.

Example 7

A sample of the silver nitrate-containing polyacrylonitrile film prepared as in Example 1 was blotted dry with a paper towel and placed on a glass plate. A 10% aqueous solution of sodium chloride was brushed over the polyacrylonitrile film with a cotton swab. The initially clear film became nearly opaque and white upon this treatment with sodium chloride.

A photographic image was produced in this film by following the procedure described in Example 6. The film was washed with saturated sodium thiosulfate solution to "fix" the image and then dried. The film had excellent physical properties.

Example 8

A sample of the stretched polyacrylonitrile film prepared as in Example 1 was blotted dry with a paper towel and a 50/50 weight percent mixture of chlorine and bromine was passed over the film for approximately 30 seconds. The initially clear film became nearly opaque and slightly yellow in color.

A photographic image was produced in the film by following the procedure described in Example 6. After "fixing" the image and drying, the film showed a high level of physical properties.

Example 9

In this example the limits for the operable compositions shown in FIGURE 1 were determined. A composition of acrylonitrile, silver nitrate and water, the mole percentages of which are shown in Table I, was mixed together at room temperature. To the mixture was added 0.8% by weight benzoin methyl ether, based on monomer content, as photoinitiator. The resulting mixture was then stirred at room temperature either until a homogeneous solution was obtained or until it was determined that more than one permanent phase had formed. Where more than one phase was thought to have formed, the stirring was carried out for a period of at least one hour prior to discarding the solution. In those cases in which a single liquid phase had formed, the pH of the resulting solution was adjusted to 6-8 by the addition of acid and the solution was subjected to photopolymerization in glass cells as described above to form homogeneous, coalesced salt- and water-containing polymeric films. It was found that the clarity of the final film was improved by this pH adjustment. In order to insure complete polymerization, irradiation was carried out for a period of two hours.

The resulting homogeneous, polymerized, salt-containing films having inherent viscosities ranging from 5 to 12 were then tested for elongation at room temperature (23° C.). The results are summarized in Table I.

TABLE I

| Test | Starting Composition (Mole percent Monomer/Salt/Water) | Elongation (percent) |
| --- | --- | --- |
| A | 50/10/40 | >300 |
| B | 45/15/40 | >300 |
| C | 40/20/40 | >300 |
| D | 40/30/30 | >300. |
| E | 35/15/50 | >300. |
| F | 25/15/60 | >300. |
| G [1] | 70/10/20 | <300. |
| H [1] | 50/35/15 | <100. |
| I [1] | 5/20/75 | <100. |
| J [1] | 10/30/60 | <100. |
| K [1] | 10/10/80 | two separate liquid phases. |
| L [1] | 15/10/75 | Do. |
| M [1] | 45/ 5/55 | Do. |

[1] Outside operable range of compositions.
< Less than.
> Greater than.

Having fully described the invention, what is claimed is:

1. A process for preparing shaped polymeric articles which comprises the steps, in sequence, of mixing 17-73 mole percent of water, 5-35 mole percent of silver nitrate and 15-70 mole percent of at least one polymerizable monomer, said monomer composed of 75-100%, by weight, of acrylonitrile and the remainder being an ethylenically unsaturated monomer copolymerizable with acrylonitrile, the mole percentages of the water, the silver nitrate and the monomer falling within the area ABCDEFG of FIGURE 1; polymerizing said monomer to form a silver nitrate-containing polymer; shaping said silver nitrate-containing polymer into a shaped article; reacting and converting said silver nitrate to water-insoluble particles selected from the group consisting of silver, silver sulfide, silver chloride, silver bromide and silver iodide particles; and, thereafter, drying the particle-containing shaped article at a temperature of 50–250° C.

2. A process as in claim 1 wherein said polymerizable monomer is composed of 100%, by weight, of acrylonitrile.

3. A process as claim 1 wherein said water-insoluble particles are silver particles.

4. A process as in claim 1 wherein said water-insoluble particles are silver chloride particles.

5. A process as in claim 3 wherein conversion to silver particles is accomplished by reaction with a solution of sodium borohydride.

6. A process for preparing shaped polymeric articles which comprises the steps, in sequence, of mixing 26–72 mole percent of water, 7–35 mole percent of silver nitrate and 17–54 mole percent of at least one polymerizable monomer, said monomer composed of 75–100%, by weight, of acrylonitrile and the remainder being an ethylenically unsaturated monomer copolymerizable with acrylonitrile, the mole percentages of the water, the silver nitrate and the monomer falling within the area ADE of FIGURE 1; polymerizing said monomer to form a silver nitrate-containing polymer; shaping said silver nitrate-containing polymer into a shaped article; reacting and converting said silver nitrate to water-insoluble particles selected from the group consisting of silver, silver sulfide, silver chloride, silver bromide and silver iodide particles; and, thereafter, drying the particle-containing shaped article at a temperature of 50–250° C.

7. A process for preparing shaped polymeric articles which comprises the steps, in sequence, of mixing 17–73 mole percent of water, 5–35 mole percent of silver nitrate and 15–70 mole percent of at least one polymerizable monomer, said monomer composed of 75–100%, by weight, of acrylonitrile and the remainder being an ethylenically unsaturated monomer copolymerizable with acrylonitrile, the mole percentages of the water, the silver nitrate and the monomer falling within the area ABCDEFG of FIGURE 1; polymerizing said monomer to form a silver nitrate-containing polymer; shaping said polymer into a shaped article; elongating said silver nitrate-containing article in at least one direction; reacting and converting said silver nitrate to water-insoluble particles selected from the group consisting of silver, silver sulfide, silver chloride, silver bromide and silver iodide particles while holding said article under tension; and, thereafter, drying the particle-containing shaped article at a temperature of 50–250° C. while holding said article under tension.

8. A process for preparing a self-supporting polymeric film which comprises the steps, in sequence, of mixing 17–73 mole percent of water, 5–35 mole percent of silver nitrate and 15–70 mole percent of at least one polymerizable monomer, said monomer composed of 75–100%, by weight, of acrylonitrile and the remainder being an ethylenically unsaturated monomer copolymerizable with acrylonitrile, the mole percentages of the water, the silver nitrate and the monomer falling within the area ABCDEFG of FIGURE 1; polymerizing said monomer to form a silver nitrate-containing polymer; shaping said polymer into the form of a film; elongating the silver nitrate-containing polymeric film at least 1.5× in at least one direction; reacting and converting said silver nitrate to water-insoluble particles selected from the group consisting of silver, silver sulfide, silver chloride, silver bromide and silver iodide particles while holding said film under tension; and, thereafter, drying the particle-containing self-supporting film at a temperature of 50–250° C. while holding said film under tension.

9. A process as in claim 8 wherein the film is stretched at least 1.5× in two mutually perpendicular directions.

10. A process as in claim 8 wherein said polymerizable monomer is composed of 100%, by weight, of acrylonitrile.

11. A process for preparing a self-supporting polymeric film which comprises the steps, in sequence, of mixing 26–72 mole percent of water, 7–35 mole percent of silver nitrate and 17–54 mole percent of at least one polymerizable monomer, said monomer composed of 75–100%, by weight, of acrylonitrile and the remainder being an ethylenically unsaturated monomer copolymerizable with acrylonitrile, the mole percentages of the water, the silver nitrate and the monomer falling within the area ADE of FIGURE 1; polymerizing said monomer to form a silver nitrate-containing polymer; shaping said polymer into the form of a film; elongating the silver nitrate-containing polymeric film at least 1.5× in at least one direction; reacting and converting said silver nitrate to water-insoluble particles selected from the group consisting of silver, silver sulfide, silver chloride, silver bromide and silver iodide particles while holding said film under tension; and, thereafter, drying the particle-containing self-supporting film at a temperature of 50–250° C. while holding said film under tension.

12. A process as in claim 11 wherein the film is stretched at least 1.5× in two mutually perpendicular directions.

13. A process as in claim 11 wherein said polymerizable monomer is composed of 100%, by weight, of acrylonitrile.

14. A continuous process for preparing a polymeric film which comprises the steps, in sequence, of mixing 17–73 mole percent of water, 5–35 mole percent of silver nitrate, and 17–70 mole percent of acrylonitrile, the mole percentages of the three ingredients falling within the area ABCDEFGH of FIGURE 1; polymerizing said acrylonitrile to form a silver nitrate-containing polyacrylonitrile; casting said silver nitrate-containing polyacrylonitrile in the form of a film; completing polymerization of the silver nitrate-containing polyacrylonitrile film; stretching said film in a direction transverse to its length at least 1.5 times its original width; stretching said one-way stretched film in the longitudinal direction at least 1.5 times its original length; reacting and converting said silver nitrate to water-insoluble particles selected from the group consisting of silver, silver sulfide, silver chloride, silver bromide and silver iodide particles while holding said film under tension; and, thereafter, drying the particle-containing film at a temperature of 50–250° C. while holding said film under tension.

References Cited in the file of this patent

UNITED STATES PATENTS

| | | |
|---|---|---|
| Re. 24,691 | Steuber | Aug. 25, 1959 |
| 2,140,921 | Rein | Dec. 20, 1938 |
| 2,417,293 | D'Alelio | Mar. 11, 1947 |
| 2,558,730 | Cresswell | July 3, 1951 |
| 2,648,592 | Stanton et al. | Aug. 11, 1953 |
| 2,648,647 | Stanton et al. | Aug. 11, 1953 |
| 2,648,648 | Stanton et al. | Aug. 11, 1953 |
| 2,684,348 | Dietrich et al. | July 20, 1954 |
| 2,721,114 | Downing et al. | Oct. 18, 1955 |
| 2,786,043 | Schuller et al. | Mar. 19, 1957 |
| 2,824,780 | Satterthwaite | Feb. 25, 1958 |
| 2,846,727 | Bechtold | Aug. 12, 1958 |
| 2,879,175 | Umblia et al. | Mar. 24, 1959 |

FOREIGN PATENTS

| | | |
|---|---|---|
| 732,007 | Great Britain | June 15, 1955 |